United States Patent
Scaramucci

[15] 3,636,972
[45] Jan. 25, 1972

[54] JACKETED VALVE
[72] Inventor: Domer Scaramucci, 3245 South Hattie, Oklahoma City, Okla. 73129
[22] Filed: May 7, 1970
[21] Appl. No.: 35,353

[52] U.S. Cl. ...........................137/340, 251/315, 251/367
[51] Int. Cl. ..............................................F16k 49/00
[58] Field of Search ..................137/340, 454.6, 454.2, 454; 251/315, 367

[56] References Cited

UNITED STATES PATENTS

| 3,348,804 | 10/1967 | Piccardo | 251/367 X |
| 2,014,463 | 9/1935 | Bard | 137/340 |
| 2,664,098 | 12/1953 | McInerney | 137/340 |
| 2,890,012 | 6/1959 | Shafer | 137/340 X |
| 2,895,496 | 7/1959 | Sanctuary | 251/367 X |
| 2,994,342 | 8/1961 | Stillwagon | 137/454.2 |
| 3,067,978 | 12/1962 | Natho | 251/315 X |
| 3,164,169 | 1/1965 | Pareto | 251/367 X |
| 3,226,082 | 12/1965 | Gulick et al. | 251/367 |

*Primary Examiner*—Samuel Scott
*Attorney*—Dunlap, Laney, Hessin & Dougherty

[57] ABSTRACT

A valve for use in a service requiring the valve to be heated or cooled, wherein the chamber for circulation of the heat transfer medium is formed between the outer periphery of the valve body and the inner periphery of a surrounding operating housing. The operating housing carries the valve operator and a valve stem. The valve body is insertable lengthwise into the operating housing and a valve stem carried by the valve body and connected to the valve member is adapted to be connected to the operating housing valve stem when the valve body is inserted into the operating housing. The valve is adapted for use between mating pipe flanges. Various types of rotary valves and valve body and operating housing configurations are disclosed.

19 Claims, 9 Drawing Figures

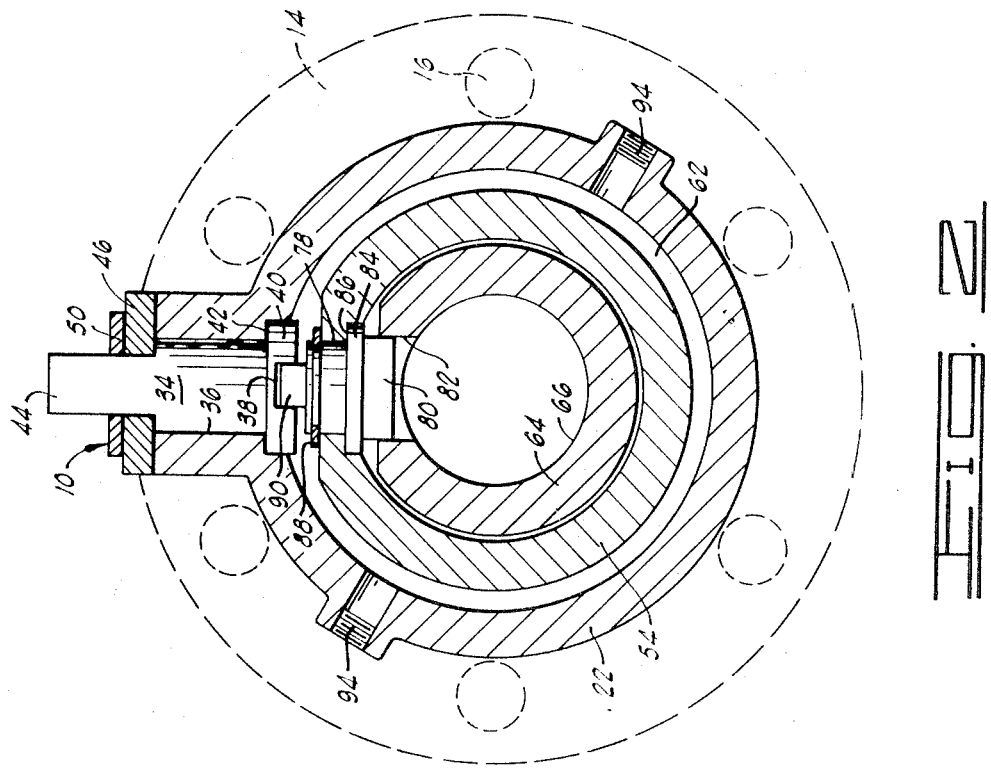
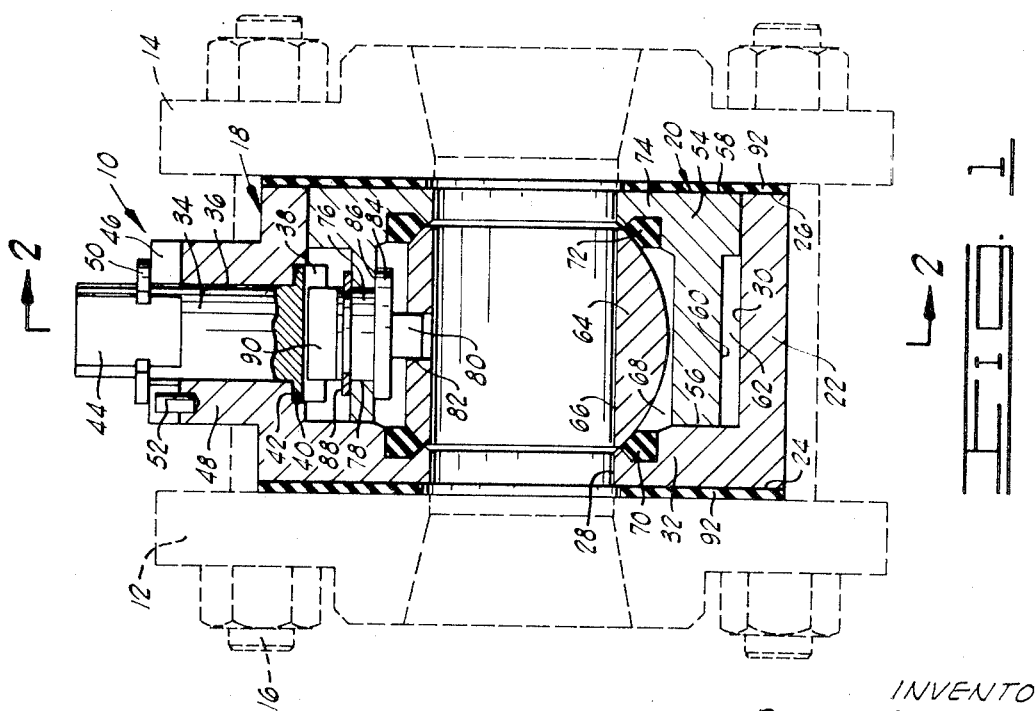

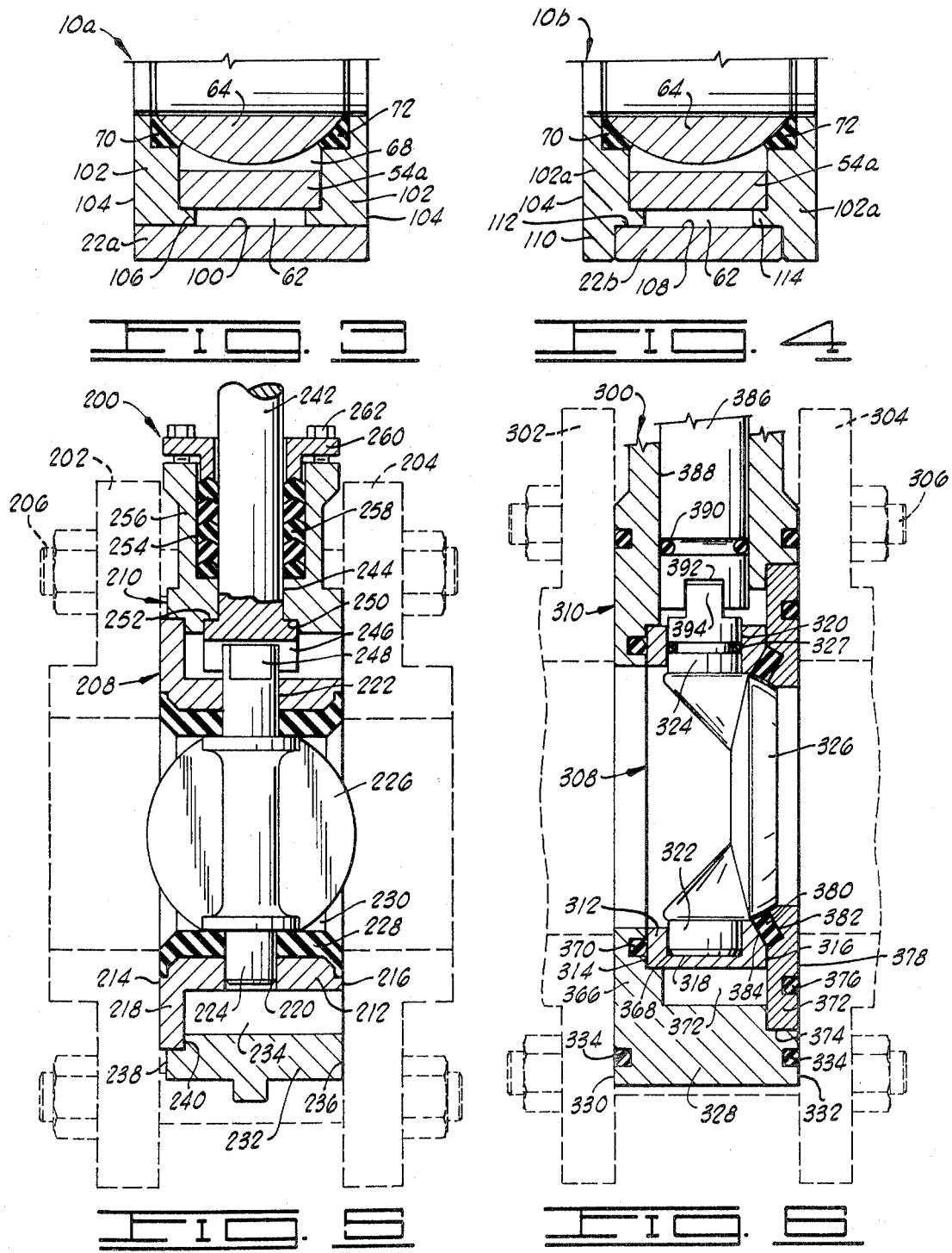

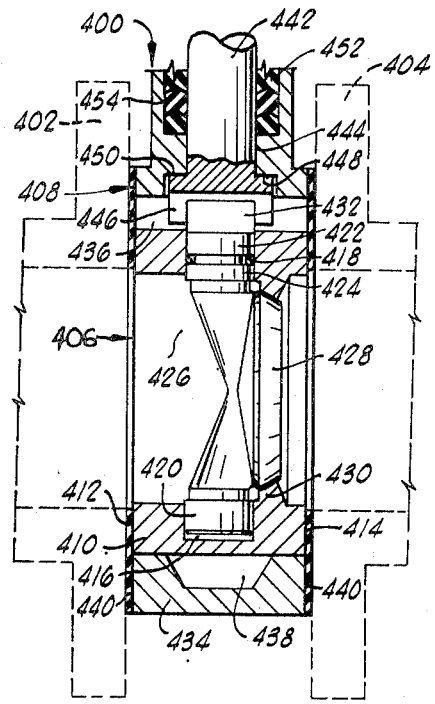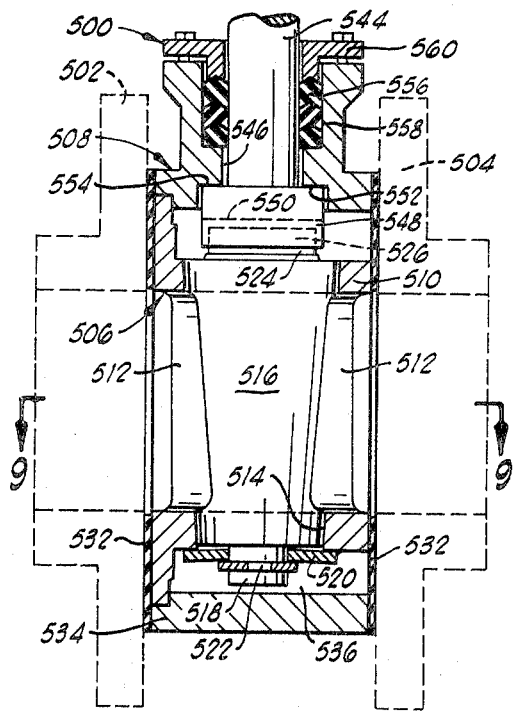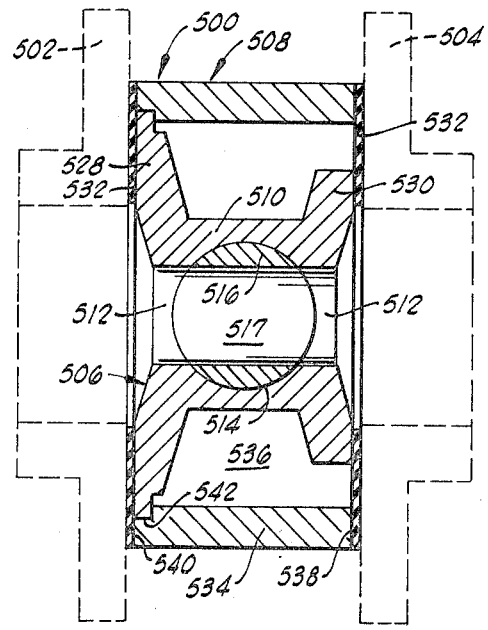

JACKETED VALVE

CROSS REFERENCES TO RELATED APPLICATIONS

Related subject matter is disclosed in applicant's copending applications, Ser. No. 763,644 entitled "Valve Assembly With Insertable VALVE Unit" filed Sept. 30, 1968; Ser. No. 818,185 entitled "Butterfly Valve Assembly" filed Apr. 17, 1969; Ser. No. 847,564 entitled "Disc Valve Assembly With Insertable Valve Member and Seats" filed Aug. 5, 1969; and Ser. No. 881,988 entitled "Plug Type Valve Assembly," filed Dec. 4, 1969.

BACKGROUND OF THE INVENTION

1. Field of the Invention

This invention relates to improvements in valves used in service conditions where the valve requires heating or cooling.

2. Description of the Prior Art

Various designs of jacketed valves have been produced in the past, but have not proven entirely satisfactory. Normally, the chamber for circulation of the heat transfer medium is provided by either welding a jacket around a portion of the valve body, or by casting fluid passageways in the walls of the valve body. In both of these types of constructions, the passageways or chambers for the heat transfer medium are not readily accessible for cleaning; the resulting structures are cumbersome and expensive; and in the event of damage to the valve body, such as by erosion or corrosion, the entire valve must be replaced.

SUMMARY OF THE INVENTION

An object of the invention is to provide a jacketed valve which may be easily repaired.

Another object of the invention is to provide a jacketed valve wherein the chamber for circulation of the heat transfer medium may be easily cleaned.

A further object of this invention is to provide an economically constructed jacketed valve.

A still further object of this invention is to provide a jacketed valve wherein the portions of the structure requiring the most frequent repair may be easily removed as a unit and replaced.

Other objects and advantages of the invention will be evident from the following detailed description when read in conjunction with the accompanying drawing illustrating the invention.

BRIEF DESCRIPTION OF THE DRAWING

FIG. 1 is a vertical sectional view of a valve constructed in accordance with this invention, with the valve being illustrated as assembled between a pair of mating pipe flanges which are shown in dashed lines.

FIG. 2 is a sectional view as taken along lines 2—2 of FIG. 1.

FIG. 3 is a partial sectional view similar to the lower half of FIG. 1 illustrating a modified valve body and operating housing construction.

FIG. 4 is a view similar to FIG. 3 illustrating another embodiment.

FIG. 5 is a view similar to FIG I illustrating a modified valve.

FIG. 6 is a view similar to FIG. 1 illustrating another embodiment.

FIG. 7 is another view similar to FIG. 1 illustrating another embodiment.

FIG. 8 is still another view similar to FIG. 1 illustrating still another embodiment.

FIG. 9 is a sectional view as taken along lines 9—9 of FIG. 8.

DESCRIPTION OF THE PREFERRED EMBODIMENTS

Referring to the drawing in detail, and particularly FIGS. 1 and 2, reference character 10 generally designates a valve constructed in accordance with this invention which is adapted to be supported between a pair of mating pipe flanges 12 and 14 interconnected by a plurality of bolts 16. The valve 10 basically comprises a housing unit generally designated by reference character 18 and a valve unit generally designated by reference character 20.

The housing unit 18 comprises an operating housing 22 having substantially flat opposite ends 24 and 26 to mate with the flat faces of the flanges 12 and 14. A bore 28 extends lengthwise through the housing 22 and is provided with a counterbore 30 extending through the major portion of the length of the housing to form a radially inwardly extending flange 32 adjacent the end 24 of the housing. The outer periphery of the housing 22 is sized and shaped to be engaged by the pipe flange bolts 16, whereby the valve 10 is supported.

A valve stem 34 is journaled in a mating aperture 36 extending transversely through what is shown as the upper portion of the operating housing in FIG. 1. The inner end of the valve stem 34 is exposed to the counterbore 30 and is provided with an elongated slot 38 therein for purposes to be described. An outwardly facing annular shoulder 40 is provided on the inner end portion of the valve stem 34 and mates with an annular shoulder 42 formed concentrically around the aperture 36 to provide a metal-to-metal seal of the valve stem 34 in the operating housing and to limit the radially outward movement of the valve stem. The outer end portion of the valve stem 34 is provided with a pair of flats 44 adapted to cooperate with a handle 46 used in turning the valve stem 34 in the usual manner. The handle 46 is held against the outer end of a neck 48 formed on the operating housing 22 by a retaining ring 50, such that the lengthwise position of the valve stem 34 is fixed. The handle 46 cooperates with a stop pin 52 carried in the outer end of the neck 48 to limit the turning movement of the valve stem 34 to approximately 90° as is conventional in the art.

The valve unit 20 comprises a valve body 54 of a size to slidingly fit in the counterbore 30 of the operating housing 22 and having a length substantially corresponding to the depth of the counterbore 30. One end 56 of the valve body 54 is adapted to abut the flange 32 of the operating housing and is adapted to be sealed to such flange 32, as by a metal-to-metal seal or by a suitable sealing member (not shown). The opposite end 58 of the valve body 54 is substantially flat to mate with the face of the respective pipe flange 14, and the outer diameter of the valve body adjacent the end 58 substantially corresponds to the diameter of the operating housing counterbore 30. The remainder 60 of the outer periphery of the valve body 54 is reduced in diameter to provide an annular chamber 62 between the operating housing and the valve body for the circulation of a heat transfer medium as will be further described.

A valve ball 64 having the usual port 66 therethrough is positioned in a valve chamber 68 formed in the interior of the valve body 54. The ball 64 is supported by a first seat 70 positioned in a mating groove in the operating housing flange 32 and by a second seat 72 mounted in a mating groove formed in a radially inwardly extending flange 74 formed adjacent the end 58 of the valve body 54. The seats 70 and 72 sealingly engage the valve ball 64 in order that flow through the valve will be stopped when the port 66 is turned at a right angle to the position shown in FIG. 1.

A second valve stem 76 extends through a mating aperture 78 formed transversely through the valve body 54. The inner end 80 of the valve stem 76 is substantially rectangular in cross section and fits in a corresponding slot 82 formed in the valve ball 64, such that the ball 64 will be turned upon turning movement of the stem 76. A circumferential flange 84 is formed around the valve stem 76 to mate with an annular shoulder 86 formed at the inner end of the aperture 78 to limit the radially outward movement of the stem 76 and provide a metal-to-metal seal of the stem 76 in the aperture 78. A retaining ring 88 is mounted in a mating groove formed in the exterior of the valve stem 76 in a position to engage the outer periphery 60 of the valve body 54 and limit the radially inward movement of the valve stem 76. Therefore, the valve stem 76 will be in a fixed lengthwise position within the valve body 54. The outer end 90 of the valve stem 76 is substantially rectangular in cross section and of a size to slidingly fit in the slot 38 at the inner end of the valve stem 34, such that turning movement of the valve stem 34 will be transmitted through the valve stem 76 to correspondingly turn the valve ball 64.

The opposite ends of the operating housing 22 and the end 58 of the valve body 54 are suitably sealed to the respective pipe flanges 12 and 14 in any suitable manner, such as by means of gaskets 92. The gasket 92 at the end 58 of the valve body 54 and the end 26 of the operating housing 22 will effectively seal one end of the annular chamber 62 formed between the valve body and the operating housing to prevent the loss of heat transfer medium between the respective ends of the valve body and operating housing. The opposite end of the annular chamber 62 is sealed by the engagement between the end 56 of the valve body 54 and the operating housing flange 32, as previously noted.

Suitable connections 94 are formed in opposite portions of the operating housing 22 in communication with the annular chamber 62 by means of which a suitable heat transfer medium may be circulated into and out of the annular chamber 62. As is well known in the art, the heat transfer medium may be a heated liquid when it is necessary to maintain the valve body 54 in a heated condition, and the heat transfer medium may be a cooling fluid when it is desired to retain the valve body 54 at a temperature less than atmospheric.

The valve 10 operates in the usual manner to control the flow of fluids between the pipe flanges 12 and 14 by manipulation of the position of the valve ball 64 as previously indicated. In the event of wear of the seats 70 or 72, it is simply necessary to remove the valve 10 from between the flanges 12 and 14 and then remove the valve unit 20 from the operating housing 22. It will be observed that the end 90 of the valve stem 76 may be easily removed lengthwise from the slot 38 of the valve stem 34. When the valve is thus disassembled, the seats 70 and/or 72 may be easily replaced. The valve unit 20 may then be replaced into the operating housing 22 in a reverse fashion.

During a normal operation, the heat transfer medium being circulated through the annular chamber 62 is completely isolated from the valve chamber 68 as previously indicated, so that there will be no leakage of the fluid being controlled into the heat transfer medium or vice verse. Also, it should be noted that the surfaces forming the annular chamber 62 are exposed when the valve unit 20 is removed from the housing unit 18 for ease in cleaning.

A modification of the configurations of the valve body and operating housing in a valve assembly of the type just described is illustrated in FIG. 3. The modified valve construction 10a shown in FIG. 3 is the same as the construction of the valve 10 except as will be noted. The modified operating housing 22a has uniform inner and outer diameters to provide a bore 100 therethrough having a uniform diameter. The modified valve body 54a also has uniform inner and outer diameters, with the outer diameter of the valve body being less than the inner diameter of the operating housing to provide an annular chamber 62 therebetween for the circulation of a heat transfer medium in the manner previously described.

It will also be observed in FIG. 3 that the length of the valve body 54a is less than the length of the operating housing 22a. As a result, identical seating rings 102 are positioned in the opposite ends of the operating housing to support the valve body 54a concentrically in the operating housing. The thickness of each ring 102 is such that the outer face 104 of the ring is coterminus with the respective outer end of the operating housing 22a when the rings abut the opposite ends of the valve body 54a. The outer diameter of each ring 102 is of a size to provide a sliding fit of the ring in the operating housing, and each ring is provided with an annular flange 106 on the inner face thereof which extends between the outer periphery of the valve body and the inner periphery of the operating housing and forms the respective end of the annular chamber 62. The mating faces of the rings 102, the valve body 54a and the operating housing 22a are sealed in any suitable manner, such as by metal-to-metal sealing, as shown, or by suitable sealing rings or gaskets (not shown) to assure that the heat transfer medium being circulated in the annular chamber 62 will not escape and to assure that the fluid being controlled will not escape from the valve chamber 68 into the annular chamber 62.

Each seating ring 102 has an inner diameter substantially corresponding to the diameter of the respective pipe flange 12 or 14 previously described in connection with FIGS. 1 and 2. The valve seats 70 and 72 are carried in mating grooves in the rings 102 in positions to sealingly engage the outer periphery of the valve ball 64 and provide effective closure of the valve when the valve ball is turned substantially 90° from the position shown in FIG. 3.

Another modification of the valve 10 is partially illustrated in FIG. 4 and designated by the general reference character 10b. The valve 10b employs the modified valve body 54a and a further modified operating housing 22b. The housing 22b is only slightly longer than the valve body 54a and has a bore 108 extending therethrough having a diameter greater than the outer diameter of the valve body 54a to provide the annular chamber 62 for the circulation of a heat transfer medium. Modified seating rings 102a are positioned at the opposite ends of the valve body 54a and the operating housing 22b. The outer face 104 of each ring 102a is substantially flat to be engaged by the respective pipe flange when the modified valve 10b is assembled between flanges in the manner previously described, and a circumferential flange portion 110 is formed on the outer periphery of each ring 102a to extend between the respective end of the operating housing 22b and the respective pipe flange to provide a valve 10b of the desired length to meet standard dimensional requirements. The outer periphery 112 of each ring 102a fits in the respective end of the bore 108 of the operating housing 22b, and a circumferential flange 114 is formed on the inner face of each ring 102a to extend between the respective end of the valve body 54a and the respective end of the operating housing 22b to hold the valve body 54a concentrically within the operating housing. It will also be noted that the inner face of each ring 102 abuts the respective end of the valve body 54a. As before, the mating surfaces of the valve body 54a, seating rings 102a and operating housing 22b are suitable sealed, such as by metal-to-metal sealing as shown in the drawing, or by use of suitable sealing rings or gaskets (not shown).

The inner diameter of each seating ring 102a substantially corresponds to the inner diameter of the respective mating pipe flange 12 or 14. The seats 70 and 72 are carried in mating grooves in the seating rings 102a in positions to sealingly engage the valve ball 64 and provide effective closure of the valve when the ball is turned substantially 90° from the position shown in FIG. 4.

EMBODIMENT OF FIG. 5

The valve 200 shown in FIG. 5 is also adapted to be positioned between a pair of mating pipe flanges 202 and 204 interconnected by a plurality of circumferentially spaced bolts 206. The valve 200 basically comprises a valve unit generally designated by reference character 208 insertable lengthwise into a housing unit generally designated by reference character 210.

The valve unit 208 comprises a tubular valve body 212 having substantially flat opposite end faces 214 and 216 to mate with the pipe flanges 202 and 204. A radially outwardly extending flange 218 is provided on the end 214 of the valve body to cooperate with the housing unit 210, as will be described.

A pair of diametrically opposed apertures 220 and 222 extend transversely through the walls of the valve body 212 to rotatably receive and journal the opposite end portions of a valve stem 224 therein. The valve stem 224 therefore extends diametrically across the valve body 212 and has a valve disc 226 suitably secured thereto for turning movement upon turning of the valve stem 224. A lining 228 of elastomeric material extends around the inner periphery of the valve body 212 to form a valve seat for the disc 226. The lining 222 also overlaps a portion of each end of the valve body 212 to sealingly engage the pipe flanges 202 and 204 to prevent the fluid being controlled from leaking outwardly across the opposite ends of the valve body. Further, the lining 228 forms stem seals around the valve stem 224. The lining 228 is preferably a rubber or rubberlike composition molded in place in the valve body 212 to enhance the adhesion of the lining to the valve body. The interior of the lining 228 forms the usual valve chamber 230 for the valve disc 226.

The housing unit 210 comprises a tubular operating housing 232 having an inner diameter greater than the outer diameter of the valve body 212 to provide an annular chamber 234 surrounding the valve body for the circulation of a heat transfer medium in the manner previously set forth. Although not shown in the drawing, the operating housing 232 will be provided with connections, such as the connections 94 shown in FIG. 2, for circulating a heat transfer medium through the annular chamber 234.

The operating housing 232 has a length slightly less than the length of the valve body 212. One end 236 of the operating housing is shaped to abut the respective pipe flange 204 and is sealed to the pipe flange in any suitable manner, such as by a metal-to-metal seal as shown, or by use of a suitable gasket or sealing ring (not shown), such that the respective end of the annular chamber 234 is sealed off. The opposite end 238 of the operating housing has a notch 240 therein to receive a portion of the valve body flange 218 and thereby support the valve unit 208 within the operating housing. The mating surfaces of the operating housing 232 and body flange 218 are sealed in any suitable manner, such as by metal-to-metal seating as shown, or by suitable sealing members (not shown) to effectively close the respective end of the annular chamber 234. The outer periphery of the operating housing 232 is shaped to be engaged by the bolts 206 interconnecting the flanges 202 and 204 for supporting the valve 200 in the desired position with the operating housing and valve body being in alignment with the centerlines of the flanges 202 and 204.

Another valve stem 242 is journaled in a mating aperture 244 formed transversely through one wall of the operating housing 232 with the inner end of the valve stem 242 being exposed to the interior of the operating housing. A rectangular slot 246 is formed in the inner end of the valve stem 242 to receive the flattened outer end 248 of the valve stem 224 forming a part of the valve unit 208, such that turning of the valve stem 242 will be transmitted through the valve stem 224 to turn the disc 226. A suitable handle or other valve operator (not shown) is provided on the outer end of the valve stem 242 for turning the valve stem in a conventional manner.

A circumferential shoulder 250 is formed on the inner end portion of the valve stem 242 facing outwardly with respect to the interior of the operating housing to mate with a corresponding shoulder 252 formed in the operating housing concentrically around the aperture 244. The mating shoulders 250 and 252 limit the radially outward movement of the valve stem 242 and also provide a metal-to-metal seal of the valve stem 242 in the apertures 244.

A counterbore 254 is formed in the outer end portion of the aperture 244 through a neck 256 formed on the operating housing to receive suitable packing 258 and thereby further effectively seal the valve stem 242 in the aperture 244. The packing 258 is held in operating position by a follower 260 adjustably secured to the outer end of the neck 256 by fasteners 262 to form a packing gland, as is well known in the art.

The valve 200 operates in journaled normal fashion of a butterfly or disc valve to control the flow of fluid between the flanges 202 and 204 by rotation of the disc 226 through approximately 90°. During operation of the valve 200, a suitable heat transfer medium is circulated through the annular chamber 234 in the same manner as described previously to either heat or cool the valve body 212. It may also be noted that the opposite ends of the annular chamber 234 are effectively closed and the valve chamber 230 is sealed from the annular chamber 234 to prevent the loss of the fluid being controlled or intermingling of the heat transfer medium with the fluid being controlled.

In the event the seat provided by the lining 228 becomes worn, or in the event leakage may be experienced around the valve stem 224 or across the opposite ends of the valve body, the valve 200 is removed from between the flanges 202 and 204. The valve unit 208 may then be removed lengthwise from the operating housing 232. During this movement of the valve unit, the flattened end 248 of the valve stem 224 slides through the slot 246 of the valve stem 242. The complete valve unit 208 may then be replaced and the new unit inserted in the operating housing 232 in the opposite direction with the flattened end 248 of the valve stem 224 moving through the slot 248 of the valve stem 242. It will also be observed that the surfaces forming the annular chamber 234 are exposed when the valve unit 208 is removed from the housing unit 210 for ease in cleaning.

EMBODIMENT OF FIG. 6

The valve 300 shown in FIG. 6 is also adapted to be positioned between a pair of mating pipe flanges 302 and 304 interconnected by a plurality of circumferentially spaced bolts 306. The valve 300 basically comprises a valve unit 308 slidingly fitting lengthwise into a housing unit 310.

The valve unit 308 comprises a tubular valve body 312 having substantially flat opposite ends 314 and 316. A circular recess 318 is formed in the inner periphery of the valve body diametrically opposed from an aperture 320 to receive a pair of valve stems 322 and 324 respectively. The valve stems 322 and 224 are secured to opposite sides of an offset-type disc 326, and the valve stems 322 and 324 are journaled in the circular recess 318 and aperture 320 respectively, for supporting the disc 326 during operation of the valve in the usual manner. An O-ring 327 fits in a mating circumferential groove in the valve stem 324 to seal the stem 324 in the aperture 320.

The housing unit 310 comprises a tubular operating housing 328 having substantially flat end faces 330 and 332 shaped to mate with the faces of the mating pipe flanges 302 and 304. It will also be observed that a sealing ring 334 is mounted in a mating groove in each of the end faces 330 and 332 of the operating housing to sealingly engage the flanges 302 and 304. A circumferential flange 366 extends radially inward at the end 330 of the operating housing 328 and has a notch 368 in the inner end thereof to receive the end 314 of the valve body 312, thereby supporting the valve body concentrically within the operating housing. An O-ring 370 is placed in a mating groove in the notch 368 to sealingly engage the end 314 of the valve body. The inner diameter of the operating housing 328 is larger than the outer diameter of the valve body 312 to provide an annular chamber 372 surrounding the valve body for the circulation of a heat transfer medium in the manner previously set forth. Although not shown in FIG. 6 it will also be understood that suitable connectors, such as the connectors 94 shown in FIG. 2, are provided in the operating housing 328 in communication with the annular chamber 372 for circulation of the heat transfer medium.

A seating ring 372 fits in a notch 374 formed in the inner periphery of the operating housing 328 at the end 332 of the operating housing and extends radially inward to abut the end 316 of the valve body 312. An O-ring 376 is positioned in a mating groove in the outer end face 378 of the seating ring 372 to sealingly engage the respective pipe flange 304. A valve seat 380 is mounted in an annular groove 382 formed in the inner face of the seating 372 and abuts a slanting face 384 formed between the inner periphery and the end 316 of the valve body 312. The seat 380 is of a size to sealingly engage the outer periphery of the valve disc 326 when the valve disc is in a closed position as illustrated in FIG. 6.

Another valve stem 386 is journaled in a mating aperture 388 formed transversely through the operating housing 328 and the inner end of the valve stem 386 is exposed to the inner periphery of the operating housing. An O-ring 390 is mounted in a mating circumferential groove around the outer periphery of the valve stem 386 to seal the valve stem 386 in the aperture 388 and prevent leakage of the heat transfer medium outwardly around the valve stem 386.

A rectangular slot 392 is formed in the inner end of the valve stem 386 to receive a rectangular projection 394 formed on the outer end of the valve stem 324, such that turning of the valve stem 386 will result in turning of the disc 326. A suitable valve operator, such as a handle (not shown) is mounted on the outer end of the valve stem 386 to provide the turning of the valve disc in the usual fashion.

The valve 300 operates in the usual manner of a disc valve wherein the disc 326 is turned from the closed position illustrated in FIG. 6 through an angle of approximately 90° to an open position to provide communication between the pipe flanges 302 and 304. The heat transfer medium being circulated through the annular chamber 372 is effectively sealed from the valve chamber formed by the inner periphery of the valve body 312 to isolate the heat transfer medium from the fluid being controlled. It will also be apparent that the opposite ends of the annular chamber 372 are effectively sealed to prevent leakage of the heat transfer medium from the valve.

In the event the seat 380 becomes worn, or in the event of damage to the valve stem seal 327, the valve 300 is removed from between the flanges 302 and 304 and the valve unit 308 may be easily moved lengthwise from the housing unit 310 by turning the valve disc 326 to an open position. The valve seat 380 and the O-ring 327 may then be easily removed and replaced. The reassembly of the valve 300 is the reverse of that described above for the disassembly. Also, the surfaces forming the annular chamber 372 are exposed for ease in cleaning when the valve unit 308 is removed from the housing unit 310.

EMBODIMENT OF FIG. 7

Another modified disc or butterfly valve 400 is illustrated in FIG. 7. This valve is also adapted to be mounted between mating pipe flanges 402 and 404 and basically comprises a valve unit 406 and a housing unit 408.

The valve unit 406 comprises a tubular valve body 410 having substantially flat end faces 412 and 414 for mating with the adjacent faces of the pipe flanges 402 and 404. A circular recess 416 is formed in the inner periphery of the valve body 410 diametrically opposed from an aperture 418 formed transversely through the opposite side of the valve body. The recess 416 and the aperture 418 receive and journally support valve stems 420 and 422. Also, an O-ring 424 is mounted in a mating groove formed around the valve stem 422 to seal the valve stem 422 in its mating aperture 418 and prevent the leakage of fluid from the valve chamber 426 formed by the inner periphery the valve body. The valve stems 420 and 422 support a valve disc 428 centrally in the valve body. The valve stems 420 and 422 may be formed integrally with the disc 428 if desired, but in that event, the body 412 must be split either horizontally or vertically in order to permit the assembly of the valve disc within the valve body. A suitable valve seat 430 is formed on or positioned in the inner periphery of the valve body 410 to sealingly engage the disc 428 when the disc is extended transversely across the valve in a closed position as illustrated in FIG. 7. The outer end 432 of the valve stem 422 projects from the outer periphery of the valve body 410 and is rectangular in cross section for purposes to be described.

The housing unit 408 comprises an operating housing 434 having an inner diameter of a size to slidingly receive and support the valve body 410. A slot 436 is formed along the length of the operating housing 434 in the inner periphery of the housing to receive the outer end 432 of the valve stem 422 when the valve unit 406 is being inserted in or removed from the housing unit 408 as will be further described. Also, an annular groove 438 is formed in the inner periphery of the operating housing 434 and communicates with the opposite sides of the slot 436 to form an annular chamber through which a heat transfer medium may be circulated in the manner set forth above. Here again, although not shown in FIG. 7, it will be understood that suitable connectors are provided in the operating housing 434 for the introduction of a heat transfer medium into the chamber 438 and removal of such heat transfer medium. The opposite ends of the operating housing 434 are substantially flat to mate with the respective pipe flanges 402 and 404. The opposite ends of both the valve body 410 and operating housing 434 are suitably sealed to the pipe flanges 402 and 404 when the pipe flanges are tightened by the usual bolts (not shown), such as by the use of suitable gaskets 440 or in any other suitable manner.

Another valve stem 442 is journaled in an aperture 444 formed transversely through the operating housing with the inner end of the valve stem 442 extending into the slot 436. A rectangular slot 446 is formed in the inner end of the valve stem 442 and is sized to slidingly receive the rectangular end 432 of the valve stem 422 when the valve is assembled as shown in FIG. 7, such that turning movement of the valve stem 442 will be transmitted to the valve disc 428. It will also be understood that a suitable valve operator, such as a handle (not shown) will be mounted on the outer end of the valve stem 442.

An annular shoulder 448 is formed around the inner end portion of the valve stem 442 and faces outwardly from the interior of the valve to mate with an annular shoulder 450 formed around the aperture 444 to limit the radially outward movement of the valve stem 442. Also, the mating shoulders 448 and 450 provide a first metal-to-metal seal of the valve stem 442 in the aperture 444. Additional sealing is provided by packing 452 mounted in a counterbore 454 formed in the outer end portion of the aperture 444. The packing 452 will be held in operating position by a suitable follower, such as the follower 260 previously illustrated in FIG. 5.

The valve 400 operates in the usual manner in the sense that the disc 428 is alternately moved from the closed position as illustrated in FIG. 7 through an arc of approximately 90° to an open position to control the flow of fluid between the pipe flanges 402 and 404. The heat transfer medium being circulated through the annular chamber 438 is effectively sealed from the valve chamber 426 to prevent the mixing of the fluid being controlled and the transfer medium.

In the event the valve seat 430 becomes worn, or the stem seal 424 becomes defective, the valve 400 is removed from between the flanges 402 and 404 and the valve disc 428 turned to its closed position as illustrated in FIG. 7. The valve unit 406 may then be removed lengthwise from the housing unit 408. During such removal operation, the rectangular end 432 of the valve stem 422 will move lengthwise through the slot 446 formed in the inner end of the valve stem 442 and then through the slot 436 formed along the inner periphery of the operating housing 434. The valve seat 430 may then be renewed in any desired fashion, depending upon the construction of the valve seat, and the stem 424 may be replaced, or the entire valve unit 406 may be replaced. Also, the walls of the annular chamber may be cleaned as necessary. The repaired or new valve unit 406 may then be replaced in the housing unit 408 in a manner reversed to that just described.

EMBODIMENT OF FIGS. 8 AND 9

A plug-type valve 500 is illustrated in FIGS. 8 and 9 and is adapted to be used between mating pipe flanges 502 and 504. The valve 500 basically comprises a valve unit 506 and a housing unit 508.

The valve unit 506 comprises a tubular housing 510 having flow ports 512 in the opposite sides thereof aligned with the openings in the pipe flanges 502 and 504. A tapered valve chamber 514 extends vertically through the valve body 510 in communication with the ports 512 to receive a plug-type valve member 516 having the usual port 517 therethrough. A cylindrical projection 518 extends from the lower end of the plug 516 beyond the outer periphery of the valve body 510. A plate 520 surrounds the projection 518 and engages the outer periphery of the valve body 510 to limit the upward movement of the plug 516 in the valve chamber 514. The plate 520 is held in operating position by a retaining ring 522 mounted in a mating groove around the projection 518 below the plate 520. It may also be noted here that in view of the tapered configuration of the plug 516 and the valve chamber 514, the plug 516 will be limited in its downward movement to the position shown in FIG. 8. A valve stem 524 projects from the upper end of the plug 516 and the outer end 526 of the stem 524 is rectangular in cross section for purposes to be described.

As shown most clearly in FIG. 9, circumferential flanges 528 and 530 extend from opposite sides of the valve body 510 in positions to engage the respective pipe flanges 502 and 504 around the ports 512 and the respective openings in the pipe flanges. The flanges 528 and 530 are preferably sealed to the pipe flanges 502 and 504 by suitable gaskets 532.

The housing unit 508 comprises an operating housing 534 surrounding the valve body 510 and having an inner diameter greater than the outside dimensions of the valve body 510 to provide an annular chamber 536 surrounding the valve body 510. It will also be understood that suitable connections similar to the connections 94 shown in FIG. 2 are provided in the walls of the operating housing 534 to provide communication with the chamber 536 for the circulation of a heat transfer medium around the valve body 510 in the manner previously set forth. One end 538 of the operating housing 534 is substantially flat to sealingly engage the respective pipe flange 504, such as by through the medium of the respective gasket 532. The opposite end 540 of the operating housing is substantially flat to sealingly engage the opposite pipe flange 502 such as through the medium of the respective gasket 532. Also, a notch 542 is provided in the inner periphery of the operating housing 534 at the end 540 to engage the outer peripheral portion of the valve body flange 528 to support the valve body 510 concentrically in the operating housing. It may also be noted that since the flanges 528 and 530, as well as the opposite ends of the operating housing 534 are sealed to the flanges 502 and 504, the annular chamber 536 will be a closed chamber. Finally, it may be noted that the outer surface of the plug 516 is sealed to the periphery of the valve chamber 514 by a metal-to-metal seal such that the valve chamber 514 will be effectively sealed from the annular chamber 536 to prevent a mixing of the fluid being controlled and the heat transfer medium.

As shown in FIG. 8, a valve stem 544 is journaled in a mating aperture 546 extending transversely through the operating housing 534 and the inner end of the valve stem 544 is exposed to the inner periphery of the operating housing. The inner end 548 of the valve stem 546 is provided with a rectangular slot 550 to slidingly receive the rectangular end 526 of the stem 524, such that turning of the valve stem 544 will result in turning of the plug 516.

An annular shoulder 552 is formed around the valve stem 544 and faces outwardly with respect to the valve to mate with an annular shoulder 554 formed in the operating housing around the aperture 546 to limit the radially outward movement of the valve stem 544. Also, the mating shoulders 552 and 554 provide a metal-to-metal seal of the valve stem 544 in the aperture 546. Additional sealing is obtained by packing 556 positioned in a counterbore 558 formed around the outer end portion of the aperture 546. The packing 556 is held in operating position by suitable follower 560 in the usual manner.

With the plug 516 in the position shown in FIGS. 8 and 9, communication is established between the pipe flanges 502 and 504. When it is desired to close the valve, the stem 544 is turned approximately 90° to turn the port 517 of the plug 516 out of communication with the ports 512. During the operation of the valve, the desired heat transfer medium is circulated through the annular chamber 536 to control the temperature of the valve body 510. As previously noted, the annular chamber 536 is shielded from the valve chamber 514 in order that the fluid being controlled will not be mixed with the heat transfer medium.

In the event the valve is not operating properly, the valve may be removed from between the pipe flanges 502 and 504 and the valve unit 506 then removed lengthwise from the housing unit 508. During this latter movement, the rectangular end 526 of the stem 524 moves through the slot 550 in the valve stem 544. An entire valve unit 506 may then be replaced or repaired and then reinserted in the housing unit 508 in a reversed manner. When the valve unit 506 is fully inserted in the housing unit 508, the steam 524 and 544 will be reconnected in the manner shown in FIG. 8 for a further operation of the valve.

From the foregoing it will be apparent that the present invention satisfies the objectives heretofore set forth.

Changes may be made in the combination and arrangement of parts or elements as heretofore set forth in the specification and shown in the drawing without departing from the spirit and scope of the invention as defined in the following claims.

What is claimed is:

1. A jacketed valve for controlling the flow of fluid between a pair of aligned pipe flanges interconnected by a plurality of circumferentially spaced bolts, comprising:
   a housing unit comprising:
      a housing having opposite end faces, a bore extending therethrough and adapted to be supported between said flanges by said bolts;
      a first valve stem journaled in a mating aperture in the housing and having one end thereof exposed to the housing bore; and
      means sealing the first valve stem in its mating aperture; and
   a valve unit supported in the housing unit comprising:
      a valve body of a size to be slid lengthwise into the housing and having a valve chamber therein communicating with the opposite ends of the valve body, the outer periphery of the valve body forming with the inner periphery of the housing an annular chamber around the valve body in an assembled position of the valve body in the housing bore;
      a valve member supported in the valve chamber for opening and closing the valve; and
      a second valve stem connected to the valve member and adapted to be connected to said first valve stem when the valve unit is inserted in the housing unit for transmitting movement of the first valve stem to the valve member;
      means preventing the flow of fluid between the valve chamber and the annular chamber; and
      means for conducting a heat transfer medium to and from the annular chamber.

2. A valve as defined in claim 1 wherein the operating housing and valve body are of substantially equal length, and wherein the means preventing the flow of fluid between the valve chamber and annular chamber includes seals sealing the opposite ends of the valve body and operating housing to the pipe flanges.

3. A valve as defined in claim 1 wherein the operating housing has a radially inwardly extending flange on one end thereof;
   one end of the valve body sealingly engages said operating housing flange; and
   said means preventing the flow of fluid between the valve chamber and the annular chamber includes means sealing the opposite end of the valve body and the opposite end of the operating housing to the respective pipe flange.

4. A valve as defined in claim 1 wherein the valve body has a radially outwardly extending flange on one end thereof;

one end of the operating housing sealingly engages said valve body flange; and said means preventing the flow of fluid between the valve chamber and the annular chamber includes means sealing the opposite end of the valve body and the opposite end of the operating housing to the respective pipe flange.

5. A valve as defined in claim 1 wherein the valve body has a length less than the length of the operating housing; and characterized further to include a seating ring in at least one end of the operating housing sealingly engaging the respective end of the valve body the operating housing and the pipe flange at the respective end of the operating housing.

6. A valve as defined in claim 1 wherein the valve body has a length less than the length of the operating housing; and characterized further to include a seating ring in each end of the operating housing sealingly engaging the respective end of the valve body, the operating housing and the pipe flange at the respective end of the operating housing.

7. A valve as defined in claim 1 wherein the first valve stem has an annular flange thereon engaging an annular shoulder in the operating housing providing a metal-to-metal seal of the first valve stem in its mating aperture.

8. A valve as defined in claim 1 wherein the means sealing the first valve stem in the operating housing includes a sealing ring surrounding the first valve stem in the aperture receiving the first valve stem.

9. A valve as defined in claim 1 wherein the means sealing the first valve stem in the operating housing includes packing around the first valve stem within the aperture receiving the first valve stem.

10. A jacketed valve for controlling the flow of fluid between a pair of aligned pipe flanges interconnected by a plurality of circumferentially spaced bolts, comprising:
a housing unit comprising:
a housing having opposite end faces, a bore extending therethrough and adapted to be supported between said flanges by said bolts;
a first valve stem journaled in a mating aperture in the housing and having one end thereof exposed to the housing bore; and
means sealing the first valve stem in its mating aperture; and
a valve unit supported in the housing unit comprising:
a valve body of a size to be slide lengthwise into the housing bore and having a valve chamber therein communicating with the opposite ends of the valve body, the outer periphery of the valve body forming with the inner periphery of the housing an annular chamber around the valve body in an assembled position of the valve body in the housing bore;
a rotary valve member supported in the valve chamber for opening and closing the valve;
a second valve stem journaled in a mating aperture in the valve body having one end thereof connected to the valve member and the opposite end thereof adapted to be connected to the first valve stem when the valve unit is inserted in the housing unit for transmitting movement of the first valve stem to the valve member;
means sealing the second valve stem in its mating aperture;
means preventing the flow of fluid between the valve chamber and the annular chamber; and
means for conducting a heat transfer medium to and from the annular chamber.

11. A valve as defined in claim 10 wherein the housing has a radially inwardly extending flange on one end thereof;
one end of the valve body sealingly engages the housing flange;
said means preventing the flow of fluid between the valve chamber and the annular chamber includes means sealing the opposite end of the valve body and the opposite end of the housing to the respective pipe flange;

and characterized further to include a seat carried by the housing flange sealingly engaging the valve member when the valve member is in a closed position.

12. A valve as defined in claim 10 wherein the valve body has a length less than the length of the housing and characterized further to include:
a seat ring in one end of the housing sealingly engaging the respective end of the valve body; and
a seat carried by the seat ring sealingly engaging the valve member when the valve member is in a closed position.

13. A valve as defined in claim 10 wherein the valve body has a length less than the length of the housing and characterized further to include:
a seat ring in each end of the housing sealingly engaging the respective end of the valve body; and
a seat carried by each seat ring sealingly engaging the valve member when the valve member is in a closed position.

14. A valve as defined in claim 10 wherein the valve body has a radially outwardly extending flange on one end thereof sealingly engaging the housing and forming one end of the annular chamber.

15. A valve as defined in claim 10 wherein the valve member is a disc, and characterized further to include:
an elastomer lining bonded around the inner periphery of the valve body forming a seat for the disc and sealingly engaging the pipe flange at each end of the valve.

16. A valve as defined in claim 10 characterized further to include a seat carried in at least one end of the valve body sealingly engaging the valve member when the valve member is in a closed position.

17. A valve as defined in claim 10 wherein the outer diameter of the valve body is substantially equal to the inner diameter of the housing; and wherein the inner periphery of the housing has a slot extending lengthwise therein to accommodate the second valve stem for removal and insertion of the valve unit, and has an annular groove in the central portion thereof intersecting and forming, with said slot, said annular chamber.

18. A jacketed valve for controlling the flow of fluid between a pair of aligned pipe flanges interconnected by a plurality of circumferentially spaced bolts, comprising:
a housing unit comprising:
a housing having opposite end faces, a bore extending therethrough and adapted to be supported between said flanges by said bolts;
a first valve stem journaled in a mating aperture in the housing and having one end thereof exposed to the housing bore; and
means sealing the first valve stem in its mating aperture; and
a valve unit supported in the housing unit comprising;
a tubular valve body insertable lengthwise into the housing and having a valve chamber extending transversely therethrough, the outer periphery of the valve body forming with the inner periphery of the housing an annular chamber around the valve body in an assembled position of the valve body in the housing bore;
means sealing each end of the valve body to the pipe flange at the respective end of the valve;
a plug valve member journaled in the valve chamber having a stem on one end thereof shaped to be connected to the first valve stem when the valve unit is inserted in the housing;
means closing the opposite ends of the annular chamber; and
means for conducting a heat transfer medium to and from the annular chamber.

19. A valve as defined in claim 18 wherein the means closing the opposite ends of the annular chamber comprises means sealing each end of the housing to the pipe flange at the respective end of the valve.

* * * * *